United States Patent
Hilemon et al.

(10) Patent No.: US 10,355,920 B2
(45) Date of Patent: Jul. 16, 2019

(54) DEFINING ACQUISITION AND MEASUREMENT DEFINITIONS IN A MACHINE MONITORING SYSTEM

(71) Applicant: Computational Systems, Inc., Knoxville, TN (US)

(72) Inventors: Christopher G. Hilemon, Knoxville, TN (US); Anthony J. Hayzen, Knoxville, TN (US); Thomas E. Nelson, Knoxville, TN (US); Michael D. Medley, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 381 days.

(21) Appl. No.: 15/209,463

(22) Filed: Jul. 13, 2016

(65) Prior Publication Data
US 2018/0019915 A1    Jan. 18, 2018

(51) Int. Cl.
| G06F 15/177 | (2006.01) |
| H04L 12/24 | (2006.01) |
| H04W 4/70 | (2018.01) |
| H04L 29/08 | (2006.01) |

(52) U.S. Cl.
CPC ......... *H04L 41/0803* (2013.01); *H04L 67/12* (2013.01); *H04W 4/70* (2018.02)

(58) Field of Classification Search
CPC ....... H04L 41/0803; H04L 67/12; H04W 4/70
See application file for complete search history.

(56) References Cited

U.S. PATENT DOCUMENTS

| 8,055,637 B2 | 11/2011 | Haub et al. |
| 9,020,906 B2 | 4/2015 | Haub et al. |
| 2003/0028521 A1* | 2/2003 | Teloh ............... H04L 41/0803 |
| 2007/0150565 A1* | 6/2007 | Ayyagari ............ H04L 67/12 709/223 |
| 2008/0154957 A1* | 6/2008 | Taylor .............. G06F 9/4411 |
| 2010/0211594 A1 | 8/2010 | Penders et al. |
| 2011/0208841 A1* | 8/2011 | Robertson ........... G06F 9/44505 709/220 |
| 2012/0117226 A1* | 5/2012 | Tanaka ............ H04L 41/0266 709/224 |

(Continued)

*Primary Examiner* — Jonathan A Bui
(74) *Attorney, Agent, or Firm* — Luedeka Neely Group, P.C.

(57) ABSTRACT

A machine monitoring system uses generically defined collection definitions, acquisition definitions, and measurement definitions to define machine data to be collected by machine monitoring devices and other data sources in a unified and device/source independent manner. Configuration software of the machine monitoring system defines data to be collected for a particular machine in such a manner that multiple different types of monitoring devices or data sources can each interpret the data definitions and provide the same type of data back to the software system. Thus, the data to be collected is defined once by the configuration software, and the data definition is interpreted internally by each monitoring device or data source. This greatly simplifies the monitoring system and provides the advantage that new monitoring devices can be added to the system to collect data without impacting the software configuration of the data required.

15 Claims, 4 Drawing Sheets

(56) References Cited

U.S. PATENT DOCUMENTS

2016/0006605 A1* 1/2016 Tsutsumi ............ H04L 41/0803
 709/220
2016/0048110 A1  2/2016 Hilemon et al.
2017/0031694 A1* 2/2017 Chu ...................... G06F 9/4416
2018/0141618 A1* 5/2018 Cheong .................... B63B 9/00

* cited by examiner

DEFINING ACQUISITION AND MEASUREMENT DEFINITIONS IN A MACHINE MONITORING SYSTEM

FIELD

This invention relates to the field of machine monitoring. More particularly, this invention relates to a system for defining data to be collected in a generic manner, so that multiple different types of machine monitoring devices or data sources can each interpret the data definitions and provide the same type of data back to the system.

BACKGROUND

In machine monitoring systems, there are often multiple types of devices used to collect machine performance data, such as vibration data. For example, there may be online measurement devices, such as the CSI 6500 Machinery Health Monitors, portable monitoring devices, such as the CSI 2130 or CSI 2140 handheld vibration analyzers, and wireless vibration transmitters, such as the CSI 9330 or CSI 9420 transmitters. In prior systems, each different type of monitoring device at each machine measurement location had to be configured independently for each measurement to be made and to specify the data to be collected. This has been a tedious and time-consuming process for those tasked with setting up the various devices to make measurements.

What is needed, therefore, is a way to define the measurements to be performed and the format of machine data to be provided by various measurement devices and other data sources in a unified and device/source independent manner.

The purpose of generically defined acquisitions and measurement definitions in a machine monitoring system is to define the machine data to be provided by measurement devices and other data sources in a unified and device/source independent manner. An example of this is a machine vibration monitoring software system in which it is desired to define the data to be collected for a particular machine in such a manner that multiple different types of vibration monitoring devices or data sources (CSI 2140, CSI 9420, CSI 6500, etc.) can each interpret the data definitions and provide the same type of data back to the software system. This implies that the data to be collected is defined once by the configuration software system and the data definition is interpreted internally by each monitoring device or data source. Although this greatly simplifies the software system, it requires each monitoring device or data source to understand the data definitions. This provides the advantage that new monitoring devices can be added to the system to collect data without impacting the software configuration of the data required.

One preferred embodiment of the invention provides a machine monitoring system for monitoring operational characteristics of one or more machine assets. The machine monitoring system includes multiple machine monitoring devices that are disposed in one or more measurement locations associated with the machine assets, and a computer for sending device-independent configuration settings to and receiving machine data from the machine monitoring devices. The machine monitoring devices comprise multiple different device types, each having data acquisition processes and capabilities that are different from other types of devices. The data acquisition processes are for configuring the machine monitoring devices to collect specified types of machine data according to specified measurement parameters. The computer generates the device-independent configuration settings for use in the multiple different types of machine monitoring devices. The configuration settings are structured according to a hierarchal format that can be interpreted by all the different types of machine monitoring devices for use in their data acquisition processes. In some preferred embodiments, a database stores the configuration settings for the various types of machines that will be monitored by various types of machine monitoring devices.

In some embodiments, the machine monitoring devices include online machine monitoring devices, wired transmitters, wireless vibration transmitters, and portable vibration analyzers.

In some embodiments, the hierarchal format of the configuration settings includes multiple hierarchal levels, including one or more machine identification levels, one or more a measurement location levels, one or more collection definition levels, one or more acquisition definition levels, and one or more measurement definition levels. The collection definition preferably includes a collection definition identification value, a collection definition state, and a collection definition descriptor. The acquisition definition preferably includes an acquisition definition identification value and an acquisition type descriptor. The measurement definition preferably includes a measurement type identification value and a measurement type descriptor.

In another aspect, embodiments of the invention provides a method for monitoring operational characteristics of machine assets using a machine monitoring system. The machine monitoring system includes multiple machine monitoring devices disposed in one or more measurement locations associated with the machine assets and a computer for sending device-independent configuration settings to and receiving machine data from the machine monitoring devices. The machine monitoring devices include multiple different types of devices, each type having data acquisition processes and capabilities that are different from other types of devices. The data acquisition processes are for configuring the machine monitoring devices to collect specified types of machine data according to specified measurement parameters. In a preferred embodiment, the method includes the following steps:

(a) inputting information at the computer to identify a machine asset and measurement locations on the machine asset;

(b) inputting information at the computer to define machine data to be collected at the measurement locations;

(c) generating configuration settings at the computer that are generically consumable by each of the different types of machine monitoring devices, wherein the configuration settings are structured according to a hierarchal format that can be interpreted by all the different types of machine monitoring devices for use in their data acquisition processes;

(d) the computer sending the configuration settings to the machine monitoring devices;

(e) the machine monitoring devices interpreting the configuration settings structured according to the hierarchal format to set up the machine monitoring devices to collect specified types of machine data according to specified measurement parameters;

(f) the machine monitoring devices collecting the machine data;

(g) the machine monitoring devices sending the collected machine data to the computer; and (h) the computer receiving and storing the collected machine data.

In some embodiments, step (c) includes generating the configuration settings according to the hierarchal format having multiple hierarchal levels, including one or more machine identification levels, one or more a measurement location levels, one or more collection definition levels, one or more acquisition definition levels, and one or more measurement definition levels.

In some embodiments, step (c) includes generating the configuration settings to include a collection definition that includes a collection definition identification value, a collection definition state, and a collection definition descriptor.

In some embodiments, step (c) includes generating the configuration settings to include an acquisition definition that includes an acquisition definition identification value and an acquisition type descriptor.

In some embodiments, step (c) includes generating the configuration settings to include a measurement definition that includes a measurement type identification value and a measurement type descriptor.

In yet another aspect, embodiments of the invention provide a method for monitoring operational characteristics of one or more machine assets using a machine monitoring system. The system comprises multiple machine monitoring devices disposed in one or more measurement locations associated with the one or more machine assets and a computer for sending configuration settings to and receiving machine data from the machine monitoring devices. The machine monitoring devices include at least a first machine monitoring device and a second machine monitoring device, each having different data acquisition processes and capabilities. The data acquisition processes configure the machine monitoring devices to collect specified types of machine data according to specified measurement parameters. One embodiment of the method includes the following steps:

(a) collecting machine data using the first machine monitoring device which has been set up using first configuration settings;

(b) receiving a command at the computer to obtain the first configuration settings from the first machine monitoring device;

(c) sending from the computer a request for the first configuration settings to the first machine monitoring device;

(d) receiving the request for the first configuration settings at the first machine monitoring device;

(e) sending the first configuration settings from the first machine monitoring device to the computer in response to the request;

(f) receiving the first configuration settings at the computer and storing the first configuration settings in a database;

(g) receiving a command at the computer to send the first configuration settings to the second machine monitoring device;

(h) in response to the command, the computer accessing, the first configuration settings in the database and creating second configuration settings based on the first configuration data;

(i) sending the second configuration settings to the second machine monitoring device; and (j) collecting machine data using the second machine monitoring device which has been set up using the second configuration settings.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 3:
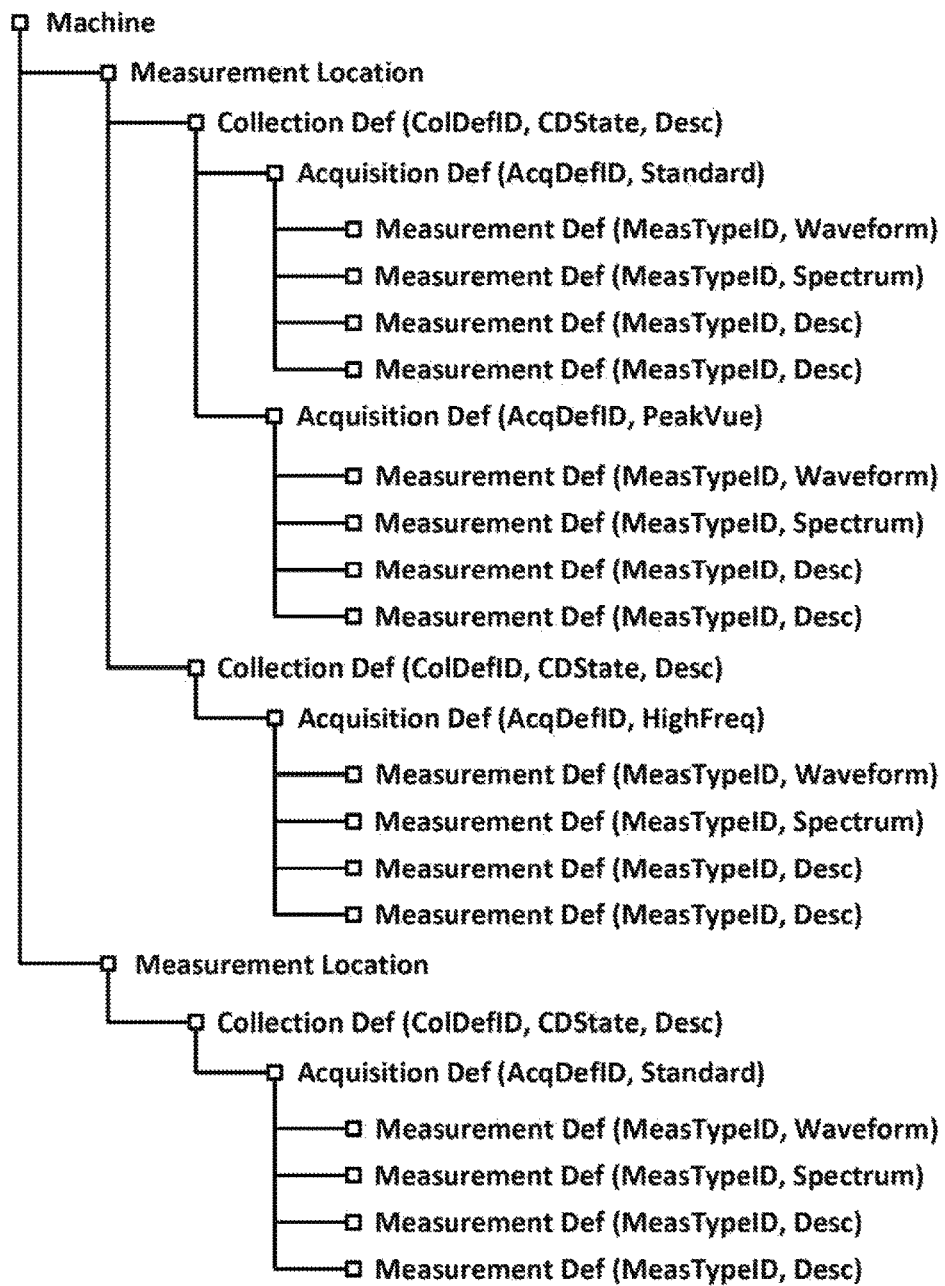
FIG. 3 depicts a configuration data structure for use in configuring machine monitoring devices to collect machine data according to a preferred embodiment.

FIG. 3 depicts a preferred embodiment of hierarchal levels of definitions included in a configuration data file fir setting up a data collection using a particular measurement device on a particular machine. The data definitions are preferably broken into three layers for each Measurement Location: Collection Definitions, Acquisition Definitions and Measurement Definitions. In a broader sense, the terms "measurement device" and "machine monitoring device" may be replaced by the term "data source," wherein data source is a broad category that includes monitoring and analysis devices of various types and other sources of machine measurement and analysis data. Although the embodiments described herein are generally based on machine vibration measurement technology, these concepts are not limited to vibration technology, but may include oil analysis, device diagnostics, and many other devices and/or data sources.

Measurement Locations

A Measurement Location (ML) is a physical location on an asset where data is collected. This may be a location where a tachometer or vibration sensor is permanently mounted, where a mobile sensor is placed temporarily for data collection, or where an oil sample is collected for analysis at a laboratory. There may be one or more Measurement Locations for a particular asset. For example, on a particular machine, Measurement Locations may include inboard and outboard bearings, each with vertical, horizontal and axial measurement positions.

In preferred embodiment, a Combined Measurement Location is a virtual measurement location used for measurements that require raw data collected at two different physical measurement locations for calculating the desired returned data. In some embodiments, data collected and returned front a Combined Measurement Location is not associated with any other Measurement Location. Combined Measurement Locations may be peers to normal Measurement Locations, and may appear the same way in routes and groupings. Examples of uses of Combined Measurement Locations include cross-correlation of vibration data between two assets (machines) and between two measurement locations that are at right angles to each other, from which the vector sum of a vibration signal can be derived.

A Measurement Location Group is used to group measurement locations together, such as when a sensor spans more than one measurement location, as is the case with a multi-axis sensor, or when data is collected from multiple sensors at the same time. In a Measurement Location Group, data is still preferably associated with each individual measurement location.

Monitoring Devices

For any given Measurement Location, data may be collected using more than one monitoring device or other data source. For example, a Measurement Location (i.e. Inboard Vertical) could be monitored with a CSI 9420 data collection device. Additional data may also be periodically collected with a CSI 2140 handheld data collection device as part of a data collection route. In this situation, some of the Collection Definitions and their associated Acquisition Definitions may be common to both devices and some may be unique to a particular device. Regardless of whether these definitions are different or the same for the two devices, the generically-defined configuration data settings are generically consumable by both devices.

Collection Definitions

In a preferred embodiment, Collection Definitions provide a means to select various measurements depending on a machine's state and the type of monitoring device in use (i.e. CSI 2140, CSI 9420). A Collection Definition defines a group of acquisitions to be taken at a given Measurement Location when the conditions of a start state of the Collection Definition are met. There may be one or multiple Collection Definitions associated with any Measurement Location.

Because Collection Definitions may be used by various different monitoring devices (i.e., CSI 2140, CSI 9420), each Collection Definition is associated with a particular monitoring device and the channel of the device, to which the sensor is attached. For portable devices, such as the CSI 2140, the device channel is preferably associated with the Measurement Location. Measurement data stored in the Machine Historian Database 22 (FIG. 2) may reference either the Measurement Location or the device channel.

Multiple Collection Definitions listed in the hierarchal structure under one Measurement Location may be evaluated in a specific order. For example, the conditions for a first Collection Definition are evaluated first, and if its start state is True, all data defined by the Acquisition Definitions and Measurement Definitions associated with the first Collection Definition will be collected. Start state conditions for a second Collection Definition will then be evaluated, followed by the others in sequence.

As shown in FIG. 3, each Collection Definition preferably includes a collection definition identification value (ColDefID), a collection definition start state (CDState), and a collection definition descriptor.

Acquisition Definitions

An Acquisition Definition specifies in device-independent terms how a device is to set itself up for data storage and analysis. An Acquisition Definition defines a specific collection of raw data that will be used to generate processed data as defined in the Measurement Definitions associated with a particular Acquisition Definition. There may be multiple Acquisition Definitions for any Collection Definition. In a preferred embodiment, all Measurement Definitions associated with a particular Acquisition Definition must be derivable from the raw data collected as specified by the Acquisition Definition's setup parameters.

For wireless monitoring devices, such as vibration transmitters, the Acquisition Definition is converted into device-specific instructions by an Asset Source Interface (ASI), which is a software entity similar to a software driver. Each vibration transmitter uses the device-specific instructions to properly configure itself to collect the data as specified in the Acquisition Definition. If the device cannot collect the data as specified, it should either:

return an error value indicating it cannot collect any data as specified;

only return data that it can acquire and indicate what data it could not acquire; or adjust the Measurement Definition for the requested data to match the device's capability, but only in certain cases (i.e. cases in which the collected data will be close to what was specified).

For all cases in which the Measurement Definitions or Acquisition Definitions are adjusted, care should be taken to ensure that such adjustment is advisable, and the data must be marked to indicate what data was changed and how.

As shown in FIG. 3, each Acquisition Definition preferably includes an acquisition definition identification value (AcqDefID) and an acquisition type descriptor, which may include but is not limited to, Standard, PeakVue, and High-Freq. For example, for a "Standard" vibration acquisition for a waveform and spectrum, the Acquisition Definition may specify the following information:

a. FMAX—In Hz or orders
b. FMIN (The low end of the usable spectrum, as set by the user based on sensor limitations or other parameters, or as limited by the window type—one line up for uniform and two lines up for Hanning.)
c. number of points per waveform
d. averaging mode—normal, peak hold, order tracking, or time synchronous. (In preferred embodiments, negative and exponential averaging is included for handhelds for analyze mode only.)
e. number of averages
f. waveform preconditioning—none, PeakVue™, or demodulation
g. waveform pre-filter (for use with PeakVue™ and demodulation)
h. trigger type—none, tach, level, or RPM
i. trigger level high (for level or RPM trigger only)
j. trigger level low (for level or RPM trigger only)
k. % pre-trigger—0% to 99%
l. window type—uniform or Hanning
m. spectrum post-processing—none, SST, or A-weighting Measurement Definitions Measurement Definitions define the data that is to be returned from the acquisition for storage. All Measurement Definitions included for a given Acquisition Definition should be derivable from the defined data acquisition. For example, in the case of a vibration data acquisition, a Measurement Definition should not have a high frequency value that is greater than the FMAX specified in the Acquisition Definition. Measurement Definitions are not limited to scalar values, but may also be arrays of data. Examples of vibration Measurement Definitions include, among many others, waveforms (arrays of data values), spectra (arrays of data values), energy in a frequency band (F1, F2, #Avg), and peak values.

As shown in FIG. 3, each Measurement Definition preferably includes a measurement type identification value (MeasTypeID) and measurement type descriptor, which may include but is not limited to, Waveform, Spectrum, Band Energy, Waveform Peak-to-Peak, and Peak-and-Phase.

An important component of Measurement Definitions that may be utilized by some data collection devices is alarm limit values. If a data collection device does not support internal data alarming, then that device simply ignores this component of the Measurement Definition. Alarm limit values are typically used by online or continuous vibration monitoring devices, such as the CSI 6500, that monitor data values continuously in a real time manner.

Figure 1:
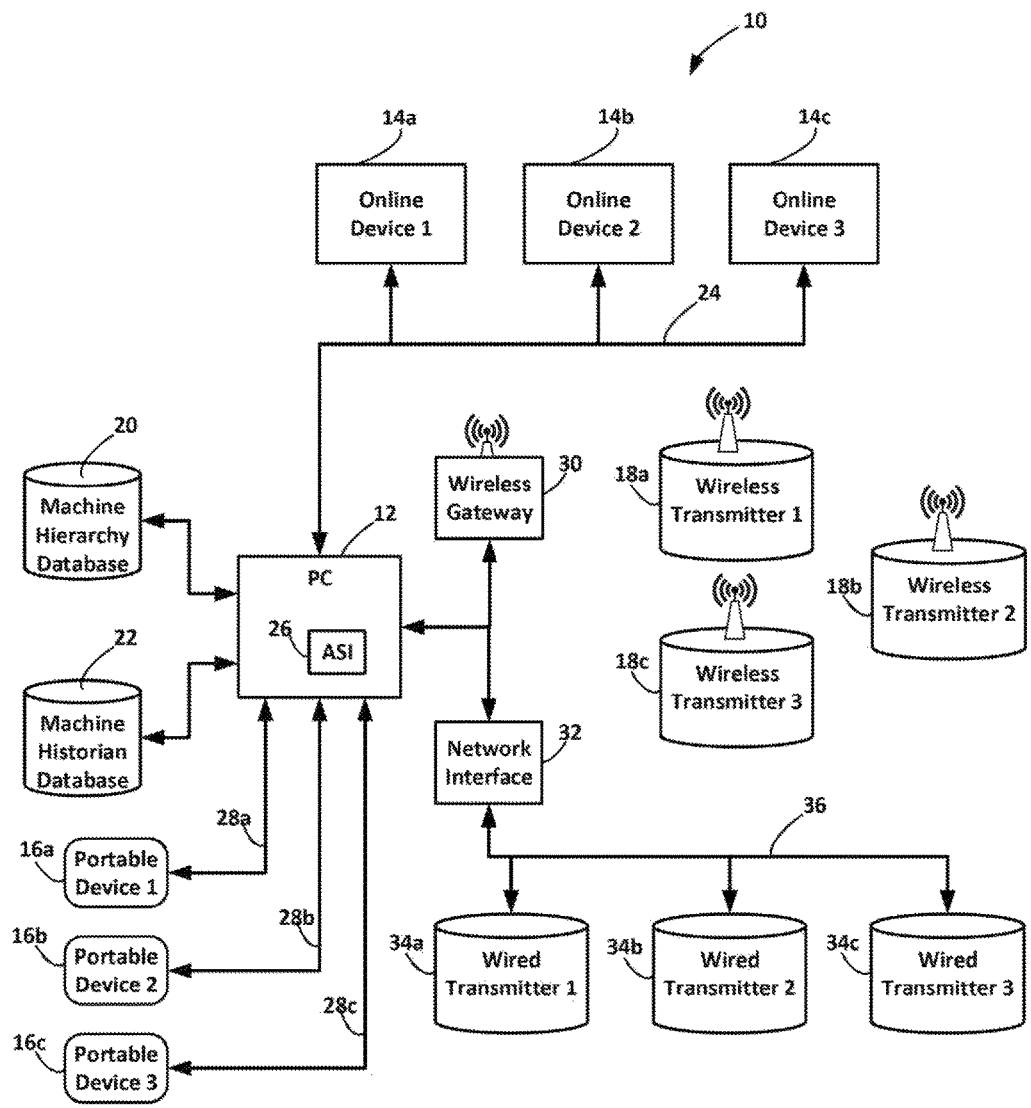
FIG. 1 depicts a machine monitoring apparatus according to a preferred embodiment.

FIG. 1 depicts a machine monitoring system 10 according to a preferred embodiment. The system 10 includes a computer 12 that is in communication with one or more online monitoring devices 14a-14c, one or more portable monitoring devices 16a-16c, and one or more vibration transmitters 18a-18c. The computer 12 is also in communication with a machine hierarchy database 20 and a machine historian database 22. In various non-limiting embodiments, the computer 12 may be a desktop personal computer, a server computer, a laptop computer, a tablet computer or a smart phone.

In some embodiments, the online monitoring devices 14a-14c are CSI 6500 Machinery Health Monitors, such as are used for continuous online machine vibration monitoring. These devices 14a-14c may be in continuous communication with the computer 12 via a communication network 24, such as an Ethernet.

In some embodiments, the portable monitoring devices 16a-16c are handheld vibration analyzers, such as the CSI 2130 or CSI 2140 analyzers, which may be used to take machine measurements along a measurement route. These devices 16a-16c may be periodically connected to the computer 12 via wired or wireless communication interfaces 28a-28c to download configuration settings and upload measurement data.

In some embodiments, the vibration transmitters 18a-18c are fixed wireless devices, such as the CSI 9330 or CSI 9420 vibration transmitters, attached to machines within a manufacturing plant. These devices 18a-18c preferably communicate wirelessly with a wireless gateway 30 that sends configuration settings to and receives measurement data from the devices 18a-18c using a wireless communication protocol. As depicted in FIG. 1, Asset Source Interface (ASI) software running on the PC converts the configuration settings into device-specific instructions that the vibration transmitters 18a-18c can understand.

Figure 2:
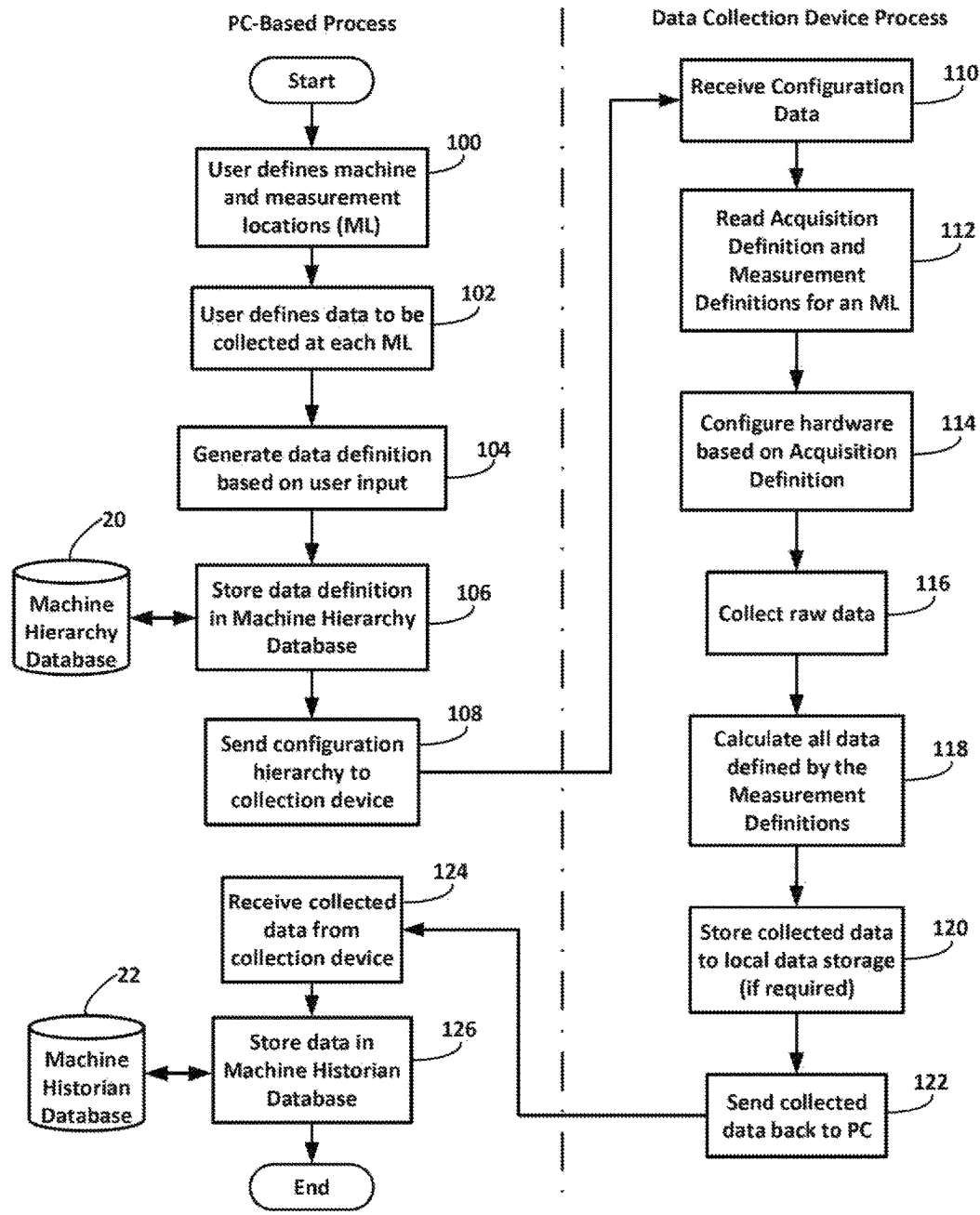
FIG. 2 depicts a machine monitoring method according to a preferred embodiment.

FIG. 2 depicts a machine monitoring process according to a preferred embodiment, in which some process steps are performed by the computer 12 and some by the data collection device (online monitoring device 14a-14c, portable monitoring device 16a-16c, wireless vibration transmitter 18a-18c, or wired vibration transmitter 34a-34c). At the computer 12, a user inputs machine information and Measurement Location information (step 100). For example, the user may specify the machine to be a particular coolant pump in a manufacturing plant and the Measurement Location is a location on the pump housing. Also at the computer 12, the user defines the data that is to be collected at the specified Measurement Location and the type of monitoring device to be used to collect the data (step 102). For example, the user may specify that the collection device is a CSI 2140 handheld analyzer 16a (FIG. 1) with a piezo accelerometer connected at channel 1, which will be used to collect standard vibration data.

Based on the machine, monitoring device(s), Measurement Location(s), Collection Definition(s), Acquisition Definition(s), and Measurement Definition(s) specified by the user, the computer 12 generates a configuration settings file having the hierarchal structure depicted in FIG. 3 (step 104). This configuration settings file is stored in the Machine Hierarchy Database 106 (step 106) and, at some point, the configuration settings are sent to the collection device 16a (step 108).

In the case of the online monitoring devices 14a-14c, the configuration settings are uploaded to the online devices 14a-14c (step 108) via the communication network 24, such as using standard Ethernet communication protocol. In the case of the wireless vibration transmitters 18a-18c, the configuration settings are transferred to the ASI 26, which creates device-specific commands based on the configuration settings. The device-specific commands are then transmitted via the wireless gateway 30 to the vibration transmitters 18a-18c (step 108). The vibration transmitters 18a-18c use the device-specific commands to configure themselves to make the specified measurements and upload the specified measurement data. In the case of the portable monitoring devices 16a-16c, the configuration settings are downloaded to the devices (step 108) when they are plugged into the interface connections 28a-28c before beginning a measurement route.

In preferred embodiments, the monitoring device receives the configuration settings (step 110) and reads the Collection Definition(s), the Acquisition Definition(s) and the associated Measurement Definition(s) for the particular Measurement Location from the configuration settings (step 112). The monitoring device then converts the Acquisition Definitions into device-specific instructions and configures itself based on those instructions to make the specified measurements (step 114). The configured monitoring device then collects the raw vibration data (step 116) and it processes the data according to the Measurement Definitions to provide the specified output data, such as time waveforms, spectra, energy in a frequency band, and peak values (step 118).

Depending on the type of collection device that collected and processed the data, the data may be stored in local data storage until such time that the data can be downloaded from the collection device, such as in the case of the portable devices 16a-16c (step 120), or the data may be immediately communicated to the computer 12 (step 122). In either case, the collected data is ultimately received at the computer 12 (step 124) and stored in the Machine Historian Database 22 (step 126) for future analysis.

Figure 4:
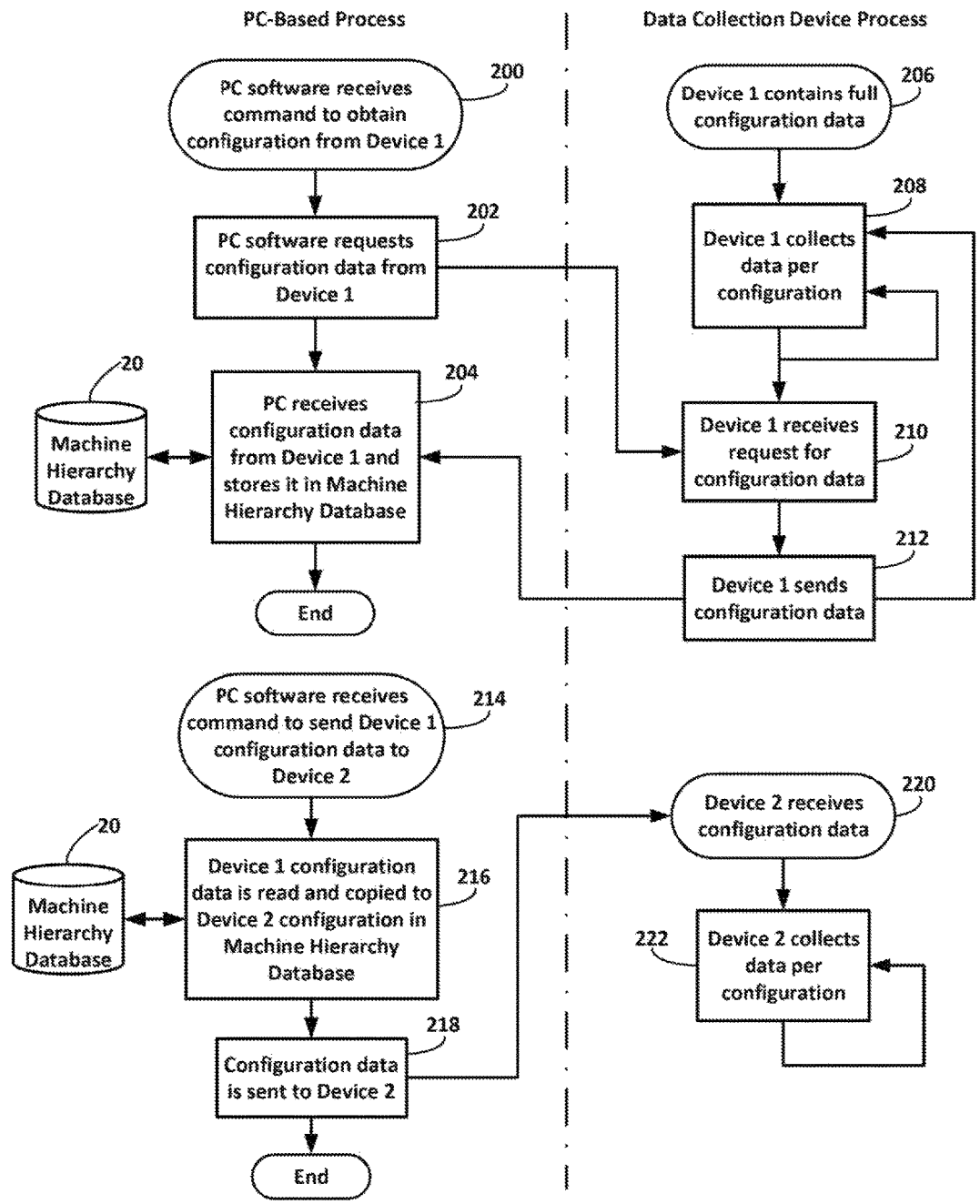
FIG. 4 depicts a measurement device configuration method according to a preferred embodiment.

FIG. 4 depicts a preferred embodiment of a process for configuring measurement devices to make measurements, in which some process steps are performed by the computer 12 and some by the data collection devices. In this example, the configuration information is to be obtained from an exemplary measurement device referred to herein as Device 1, which has been previously fully configured to collect measurement data (step 206) at a particular measurement location according to certain collection definitions, acquisition definitions and measurement definitions, and which has been collecting data according to those definitions (step 208).

To initiate the configuration process, software running on the PC 12 receives a command (from a user input device or elsewhere) to obtain device configuration information from Device 1 (step 200). Based on the received command, the PC software generates a request for configuration settings that is directed to Device 1 via the communication network (step 202). Device 1 receives the request for configuration settings (step 210) and in response, sends the configuration settings to the PC 12 via the communication network (step 212). The PC 12 receives the configuration settings from Device 1 and stores them in the Machine Hierarchy Database 20 (step 204).

Subsequently, it may be desirable to set up another device, referred to herein as Device 2, to collect machine data according to the same configuration that is used for Device 1. For example, if Device 1 failed and had to be replaced with the same type of measurement device (Device 2), it may be desirable to set up the replacement device with the same configuration. In another example, Device 1 and Device 2 may be completely different kinds of measurement devices (i.e., an online device and a wired transmitter).

In either situation, to begin the configuration process, software running on the PC 12 receives a command (from a user input device or elsewhere) to send the Device 1 configuration settings to Device 2 (step 214). Based on the received command, the PC software accesses the Device 1 configuration settings stored in the Machine Hierarchy Database 20, and copies these configuration settings into the database 20 as Device 2 configuration data file (step 216). The PC 12 then sends the Device 2 configuration settings via the communication network to Device 2 (step 218). Device 2 receives the configuration settings (step 220), configures itself accordingly and begins collecting data per the received configuration (step 222).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A machine monitoring system for monitoring operational characteristics of one or more machine assets, the machine monitoring system comprising:
    a plurality of machine monitoring devices disposed in one or more measurement locations associated with the one or more machine assets, the plurality of machine monitoring devices comprising multiple different types of machine monitoring devices, each type of machine monitoring device having a data acquisition process that is different from data acquisition processes of other types of machine monitoring devices, wherein the data acquisition processes configure the machine monitoring devices to collect certain types of machine data according to certain measurement parameters;
    a computer for sending device-independent configuration settings to and receiving machine data from the plurality of machine monitoring devices, the computer operable to generate the configuration settings for use in the data acquisition processes of each of the multiple different types of machine monitoring devices, wherein the configuration settings are structured according to a hierarchal format that can be interpreted by all of the different types of machine monitoring devices for use in their data acquisition processes; and
    a database for storing the configuration settings for the plurality of machine monitoring devices.

2. The machine monitoring system of claim 1 wherein the plurality of machine monitoring devices include one or more devices selected from the group consisting of online machine monitoring devices, wired transmitters, wireless vibration transmitters, and portable vibration analyzers.

3. The machine monitoring system of claim 1 wherein the hierarchal format of the configuration settings includes a plurality of hierarchal levels comprising:
    one or more machine identification levels;
    one or more a measurement location levels;
    one or more collection definition levels;
    one or more acquisition definition levels; and
    one or more measurement definition levels.

4. The machine monitoring system of claim 3 wherein the hierarchal levels in the configuration settings are ordered as listed in claim 3.

5. The machine monitoring system of claim 1 wherein the configuration settings include one or more collection definitions that include one or more collection definition identification values, one or more collection definition states, and one or more collection definition descriptors.

6. The machine monitoring system of claim 1 wherein the configuration settings include one or more acquisition definitions that include one or more acquisition definition identification values and one or more acquisition type descriptors.

7. The machine monitoring system of claim 1 wherein the configuration settings include one or more measurement definitions that include one or more measurement type identification values and one or more measurement type descriptors.

8. The machine monitoring system of claim 1 further comprising a machine historian database for storing the machine data received from the plurality of machine monitoring devices.

9. A method for monitoring operational characteristics of one or more machine assets using a machine monitoring system comprising multiple machine monitoring devices disposed in one or more measurement locations associated with the one or more machine assets and a computer for sending device-independent configuration settings to and receiving machine data from the machine monitoring devices, wherein the machine monitoring devices comprise multiple different types of machine monitoring devices, each type having a data acquisition process that is different from data acquisition processes of other types of machine monitoring devices, wherein the data acquisition processes configure the machine monitoring devices to collect specific types of machine data according to specified measurement parameters, the method comprising:
    (a) inputting information at the computer to identify the one or more machine assets and the one or more measurement locations on the one or more machine assets;
    (b) inputting information at the computer to define machine data to be collected at the one or more measurement locations;
    (c) generating the device-independent configuration settings at the computer that are generically consumable by each of the multiple different types of machine monitoring devices, wherein the device-independent configuration settings are structured according to a hierarchal format that can be interpreted by all of the different types of machine monitoring devices to set up their data acquisition processes;
    (d) the computer sending the device-independent configuration settings to the machine monitoring devices;
    (e) the machine monitoring devices interpreting the device-independent configuration settings structured according to the hierarchal format to set up the machine monitoring devices to collect specified types of machine data according to specified measurement parameters;
    (f) the machine monitoring devices collecting the machine data;

(g) the machine monitoring devices sending the collected machine data to the computer; and (h) the computer receiving and storing the collected machine data.

10. The method of claim 9 wherein the machine monitoring devices include one or more devices selected from the group consisting of online machine monitoring devices, wired transmitters, wireless vibration transmitters, and portable vibration analyzers.

11. The method of claim 9 wherein step (c) comprises generating the device-independent configuration settings according to the hierarchal format that includes multiple hierarchal levels comprising:

one or more machine identification levels;

one or more a measurement location levels;

one or more collection definition levels;

one or more acquisition definition levels; and one or more measurement definition levels.

12. The method of claim 11 wherein the hierarchal levels in the device-independent configuration settings are ordered as listed in claim 11.

13. The method of claim 9 wherein step (c) includes generating the device-independent configuration settings to include one or more collection definitions that include one or more collection definition identification values, one or more collection definition states, and one or more collection definition descriptors.

14. The method of claim 9 wherein step (c) includes generating the device-independent configuration settings to include one or more acquisition definitions that include one or more acquisition definition identification values and one or more acquisition type descriptors.

15. The method of claim 9 wherein step (c) includes generating the device-independent configuration settings to include one or more measurement definitions that include one or more measurement type identification values and one or more measurement type descriptors.

* * * * *